US009763305B1

(12) United States Patent
Pamato et al.

(10) Patent No.: US 9,763,305 B1
(45) Date of Patent: Sep. 12, 2017

(54) TEMPERATURE PROTECTION CIRCUIT FOR LIGHT-EMITTING DIODES

(71) Applicant: Infineon Technologies Austria AG, Villach (AT)

(72) Inventors: Marco Pamato, Schio (IT); Maurizio Galvano, Padua (IT)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/130,635

(22) Filed: Apr. 15, 2016

(51) Int. Cl.
  H05B 37/02 (2006.01)
  H05B 33/08 (2006.01)

(52) U.S. Cl.
  CPC ....... *H05B 33/0884* (2013.01); *H05B 33/083* (2013.01); *H05B 33/0815* (2013.01); *H05B 33/0845* (2013.01); *H05B 33/0857* (2013.01)

(58) Field of Classification Search
  CPC ............ H05B 33/0815; H05B 33/0866; H05B 33/0851; H05B 33/0809; H05B 33/0812; H05B 33/0821; H05B 33/0827; H05B 33/0833; H05B 33/0848; H02M 3/156; Y02B 20/346; Y02B 20/343; G09G 2320/041; G09G 3/2081
  See application file for complete search history.

(56) References Cited

U.S. PATENT DOCUMENTS

| | | | | |
|---|---|---|---|---|
| 7,999,487 B2 * | 8/2011 | Szczeszynski | ..... | H05B 33/0815 315/246 |
| 8,319,442 B2 * | 11/2012 | Lin | ..... | H05B 33/0827 315/185 R |
| 8,354,799 B2 * | 1/2013 | Yang | ..... | H05B 33/089 315/185 S |
| 8,358,116 B2 * | 1/2013 | Krapp | ..... | H02M 3/156 323/222 |
| 8,368,636 B2 * | 2/2013 | Shteynberg | ..... | H05B 33/0818 345/102 |
| 8,446,108 B2 * | 5/2013 | Zhang | ..... | H05B 33/0851 315/117 |
| 8,450,948 B2 * | 5/2013 | Huang | ..... | H05B 33/0845 315/291 |

(Continued)

OTHER PUBLICATIONS

"A6263, Protected LED Array Driver," Allegro MicroSystems, LLC, Data Sheet, 2013, 11 pp. (Applicant points out, in accordance with MPEP 609.04(a), that the year of publication, 2013, is sufficiently earlier than the effective U.S. filing date, Apr. 15, 2016, so that the particular month of publication is not in issue.).

(Continued)

*Primary Examiner* — Vibol Tan
(74) *Attorney, Agent, or Firm* — Shumaker & Sieffert, P.A.

(57) ABSTRACT

Techniques are disclosed for regulating the temperature of a plurality of light-emitting diodes (LEDs) by monitoring the voltage drop across the LEDs. In one example, a driver circuit supplies a constant driver current to the LEDs. A temperature regulation circuit monitors the voltage drop across the LEDs to determine whether the junction temperature of the LEDs exceeds a maximum operating temperature. If the junction temperature of the LEDs exceeds the maximum operating temperature, the temperature regulation circuit uses digital pulse-width modulation (DPWM) to decrease a digital duty cycle of the driver current supplied to the LEDs.

22 Claims, 11 Drawing Sheets

(56) References Cited

U.S. PATENT DOCUMENTS 8,708,560 B2 * 4/2014 Kraemer ............ H05B 33/0803
250/494.1

OTHER PUBLICATIONS

"TPS9263x-Q1 Three Channel Linear LED Driver With Analog and PWM Dimming," Texas Instruments, Data Sheet, Jan. 2015, 39 pp.
"Infineon® LITIX™ Basic, TLD1313EL, 3 Channel High Side Current Source," Infineon, Automotive, Data Sheet, Mar. 24, 2015, 31 pp.
Kawabata et al., "Practical Optical Measurements of OLED Panels for Lighting Applications," CORM (Council for Optical Radiation Measurements) 2013 Conference, May 7-9, 2013, 33 pp.
Yilmazer et al., "Intelligent Over Temperature Protection for LED Lighting Applications," Infineon, White Paper, Oct. 1, 2013, 16 pp.

* cited by examiner

US 9,763,305 B1

TEMPERATURE PROTECTION CIRCUIT FOR LIGHT-EMITTING DIODES

TECHNICAL FIELD

This disclosure generally relates to temperature protection for electrical loads and, more specifically, to temperature protection of light emitting diodes (LEDs).

BACKGROUND

A light-emitting diode (LED) driver is an electrical device which regulates the power to one or more LEDs. The power level of the LED is maintained constant by the LED driver as the electrical properties change throughout the temperature increases and decreases seen by the LED or LEDs. Without the proper driver, the LED may become too hot and unstable, therefore causing poor performance or early failure.

SUMMARY

In general, the disclosure describes techniques for regulating the temperature of an LED by monitoring the voltage potential across the LED, rather than the actual temperature. In general, the techniques of the disclosure make use of the fact that, given a constant current, the voltage potential across an LED will vary only according to the junction temperature of the LED. According to the techniques of the disclosure, a driver circuit supplies a constant current to one or more LEDs. A temperature regulation circuit monitors the voltage potential across the LED to determine the junction temperature of the LED. In response to this temperature determination, the temperature regulation circuit uses modulation to digitally regulate a duty cycle of a driver current supplied to the LED so as to regulate the temperature of the LED. Accordingly, a driver circuit as described herein does not require a thermocouple, and accordingly is cheaper than other driver circuits. Further, a driver circuit as described herein does not require that the LED array be positioned on the same board as the driver circuit, and accordingly is more flexible than other driver circuit designs. Additionally, because a driver circuit as described herein digitally modulates a duty cycle of a driver current supplied to the LED array, the driver circuit ensures that the LED array receives a constant peak current when it is operating, thus preventing chromaticity and color shift or instability encountered when decreasing peak current to decrease LED intensity. Finally, an LED driver as disclosed within allows the operational lifetime of the LED array to be optimized because the thermal limitations of the LED array and LED driver may be separately configured.

In one example, this disclosure describes a method including: receiving, by a temperature regulation circuit of a light-emitting diode (LED) driver, a first signal indicating a voltage potential across a plurality of LEDs; and in response to the received first signal, outputting, by the temperature regulation circuit, a second signal configured to regulate temperature of the plurality of LEDs by dynamically modulating a duty cycle of a switch delivering current to the plurality of LEDs.

In another example, this disclosure describes a temperature regulation circuit of a light emitting diode (LED) driver configured to: receive a first signal indicating a voltage potential across a plurality of LEDs; and in response to the received first signal, output a second signal configured to regulate temperature of the plurality of LEDs by dynamically modulating a duty cycle of a switch delivering current to the plurality of LEDs.

In another example, this disclosure describes a system including: a plurality of light-emitting diodes (LEDs) configured to output a first signal indicating a voltage potential across the plurality of LEDs; and a light-emitting diode (LED) driver including: a temperature regulation circuit configured to: receive the first signal indicating the voltage potential across the plurality of LEDs; and in response to the received first signal, output a second signal configured to dynamically modulate, using pulse-width-modulation (PWM), a duty cycle of a switch delivering current to the plurality of LEDs; and the switch, configured to deliver current to the plurality of LEDs according to the duty cycle defined by the second signal.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
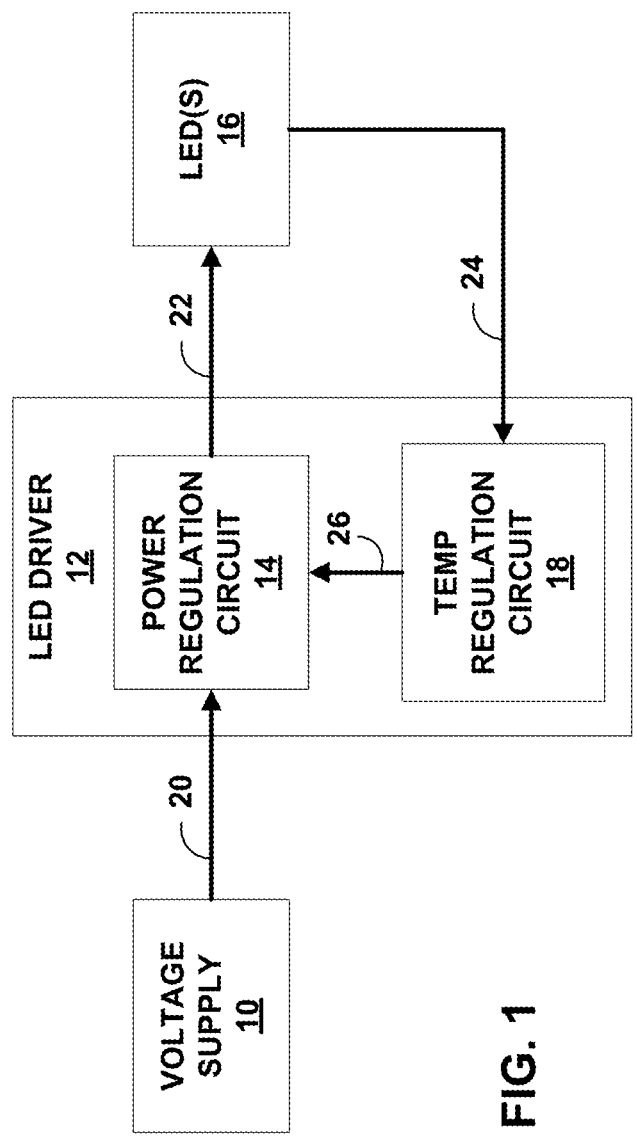
FIG. 1 is a block diagram illustrating an example LED driver circuit which performs temperature regulation of one or more LEDs according to the techniques of the disclosure.

A light-emitting diode (LED) driver is an electrical device which regulates the power to one or more LEDs. An LED driver responds to the changing needs of the LED by providing a constant quantity of power to the LED as its electrical properties change with temperature. An LED driver is a self-contained power supply which has outputs that are matched to the electrical characteristics of the LED or LEDs. LED drivers may offer dimming by means of modulation circuits and may have more than one channel for separate control of different LEDs or LED arrays. The power level of the LED is maintained constant by the LED driver as the electrical properties change throughout the temperature increases and decreases seen by the LED or LEDs. Without the proper driver, the LED may become too hot and unstable, therefore causing poor performance or early failure. For example, the operating lifetime of an LED significantly decreases as the average junction temperature (TJ) increases.

In a first design for a temperature protection circuit for an LED driver, a thermocouple is directly connected to the load (e.g., the LED) and monitors the temperature of the LED. This design is expensive because it requires numerous expensive thermocouples to function. Further, this design requires a large amount of circuit board space because it requires additional connections for the thermocouples.

In another design for a temperature protection circuit for an LED driver, the load is placed in the same board as the current regulator. This design assumes that the current regulator and the load reach approximately the same operating temperature because of their proximity. A thermocouple monitors the junction temperature of the current regulator, which indirectly monitors the temperature of the LED. This design lacks versatility because the LED must be positioned close to the LED driver circuit, or the junction temperature of the driver circuit may not correlate to the junction temperature of the LED. In real-world applications, the LED is frequently positioned far from the driver circuit to meet design constraints. This means that limiting current supplied to the LED based on the measured junction temperature of the driver circuit may not prevent the LED from overheating in a design wherein the LED is far enough from the driver circuit that they have different temperatures.

Both of these designs regulate the temperature of the LED load by directly measuring temperature and using a feedback loop to reduce the peak driver current supplied to the load in response to the measured temperature. This methodology has the disadvantage that, to reduce the intensity of the LEDs, the driver reduces the peak driver current supplied to the LEDs. When the peak driver current is reduced below the minimum specifications of the LEDs, the LEDs may fail to function properly. For example, if the peak current delivered to the LED is less than the minimum current defined by the specification set by the manufacturer, the LED may undergo chromaticity shift or color instability. This means that the LED may emit a different color hue than intended, which may have negative consequences for the system incorporating the LED.

A diode, such as LED, has a known relationship between the current flowing through the diode, the voltage differential across the diode, and the temperature of the diode's junctions. This relationship is described by the ideal diode equation:

$$I = I_0 \left( e^{\frac{qV}{nkT}} - 1 \right)$$

In the above equation, I is the current flowing through the diode, $I_0$ is the diode leakage current density, q is the absolute value of electron charge, V is the voltage differential across the diode, n is an ideality factor between 1 and 2, k is Boltzmann's constant, and T is the absolute temperature in Kelvin of the junctions of the diode. It may be understood that, where $I_0$, q, n, and k are constants, and I and V have known values, the temperature T of the junctions of the diode may be calculated.

FIG. 1 is a block diagram illustrating an example LED driver circuit 12 which performs temperature regulation of one or more LEDs 16 according to the techniques of the disclosure. In general, LED driver 12 receives a supply current 20 from a voltage supply 10. A power regulation circuit 14 performs digital modulation of the supply current 20 so as to create a digitally modulated driver current 22 for driving LEDs 16. Temperature regulation circuit 18 receives a signal 24 indicating a voltage potential across LEDs 16. Because the voltage potential across LEDs 16 and the driver current 22 are known, temperature regulation circuit 18 may calculate the temperature of LEDs 16. Based on this calculated temperature, temperature regulation circuit 18 may adjust a duty cycle of power regulation circuit 14 so as to adjust the "on" time of supply current 22 delivered to LEDs 16, thereby regulating the temperature of LEDs 16.

While the techniques of the disclosure are illustrated herein by providing examples of modulation performed using digital pulse-width modulation (DPWM), the techniques of this disclosure may also be applicable to other types of modulation signals. In some examples, digital pulse-duration modulation or digital pulse density modulation may be used instead of DPWM to modulate the duty cycle.

Voltage supply 10 is a power source configured to provide power to LED driver 12. In some examples, voltage supply 10 is a battery, such as an Alkaline, Zinc-Carbon, Lead-Acid, Mercury, Lithium Ion, Lithium Polymer, Silver Oxide, Nickel-Cadmium, Nickel-Metal Hydride, or Nickel-Zinc battery. In some examples, voltage supply 10 is a direct current ("DC") power supply, an alternating-current (AC) power supply rectified to provide a DC power supply, or an output of a linear voltage regulator.

Power regulation circuit 14 converts constant current 20 into driver current 22, which is a square wave having a duty cycle controlled by a DPWM control signal 26 from temperature regulation circuit 18. In some examples, power regulation circuit 14 is a current regulator. The duty cycle describes the proportion of "on" time to the "off" time of the signal. In other words, a "high" duty cycle corresponds to high power and high average current because the driver current 22 is on for most of the time. In contrast, a "low" duty cycle corresponds to low power and a low average current because the driver current 22 is off for most of the time. Duty cycle is expressed in percent, with 100% being fully on (e.g., a constant DC current). In some examples, power regulation circuit 14 is a counter-comparator DPWM, a delay-line mux DPWM, a ring-oscillator mux DPWM, or a hybrid DPWM, such as a system combining both counter-comparator and ring-oscillator mux configurations.

Temperature regulation circuit 18 serves to monitor the voltage potential across LEDs 16 and calculate the temperature of LEDs 16 based on the monitored voltage. In response to the determined temperature, temperature regulation circuit 18 adjusts the duty cycle of DPWM so as to regulate driver current 22 supplied to LEDs 16. For example, upon determining that a voltage potential 24 across LEDs 16 indicates a high operating junction temperature, temperature regulation circuit 18 reduces the duty cycle of power regulation circuit 14, so as to reduce the average current supplied to LEDs 16 by driver current 22. In another example, upon determining that a voltage potential 24 across LEDs 16 indicates LEDs 16 have cooled to a low or nominal operating junction temperature, temperature regulation circuit 18 increases the duty cycle of power regulation circuit 14, so as to increase the average current supplied to LEDs 16 by driver current 22 back to a normal operating power.

LEDs 16 may be any sort of LED, such as organic LEDs (OLEDs), phosphor-based LEDs, Quantum Dot LEDs (QD-LEDs), miniature LEDs, low-current LEDs, ultra-high output LEDs, high-power LEDs, multi-color LEDs, or filament LEDs. In some examples, LED 16 is a single LED. In other examples, LEDs 16 are a string of LEDs, a group of strings of LEDs, or an array of LEDs. However, the techniques of the disclosure are not limited to LEDs, but equally may be applied to perform temperature regulation of any electrical load wherein the voltage potential across the load varies as a function of current and temperature.

Accordingly, LED driver 12 may perform temperature monitoring and protection of LEDs 16 without using an expensive thermocouple by monitoring the voltage of LEDs 16 instead of the temperature of LEDs 16. Also, because LEDs 16 are directly measured, instead of inferring a temperature of LEDs 16 from the temperature of LED driver 12, there is no requirement that LEDs 16 be positioned within the same circuit board in close proximity to LED driver 12 to receive accurate measurements.

Furthermore, because the driver current 22 is digitally modulated using pulse-width modulation, the actual current received by LEDs 16 remains either at a constant value or zero. Thus, temperature regulation circuit 18 increasing or decreasing the "on" time of the duty cycle of the driver current to adjust the average driver current delivered to LEDs 16, thus reducing the intensity of LEDs 16. In this way, LED driver 12 reduces the intensity of LEDs 16 yet continues to supply a constant peak current to LEDs 16, allowing LEDs 16 to operate within the specified design parameters and prevent chromaticity and color shift or other negative characteristics experienced when the intensity of LEDs 16 is reduced by reducing peak current. Therefore, LED driver 12 may use DPWM to adjust the average current received by LEDs 16 and thus the intensity of LEDs 16, so as to reduce power delivered to LEDs 16 and prevent thermal damage due to overheating.

Figure 2:
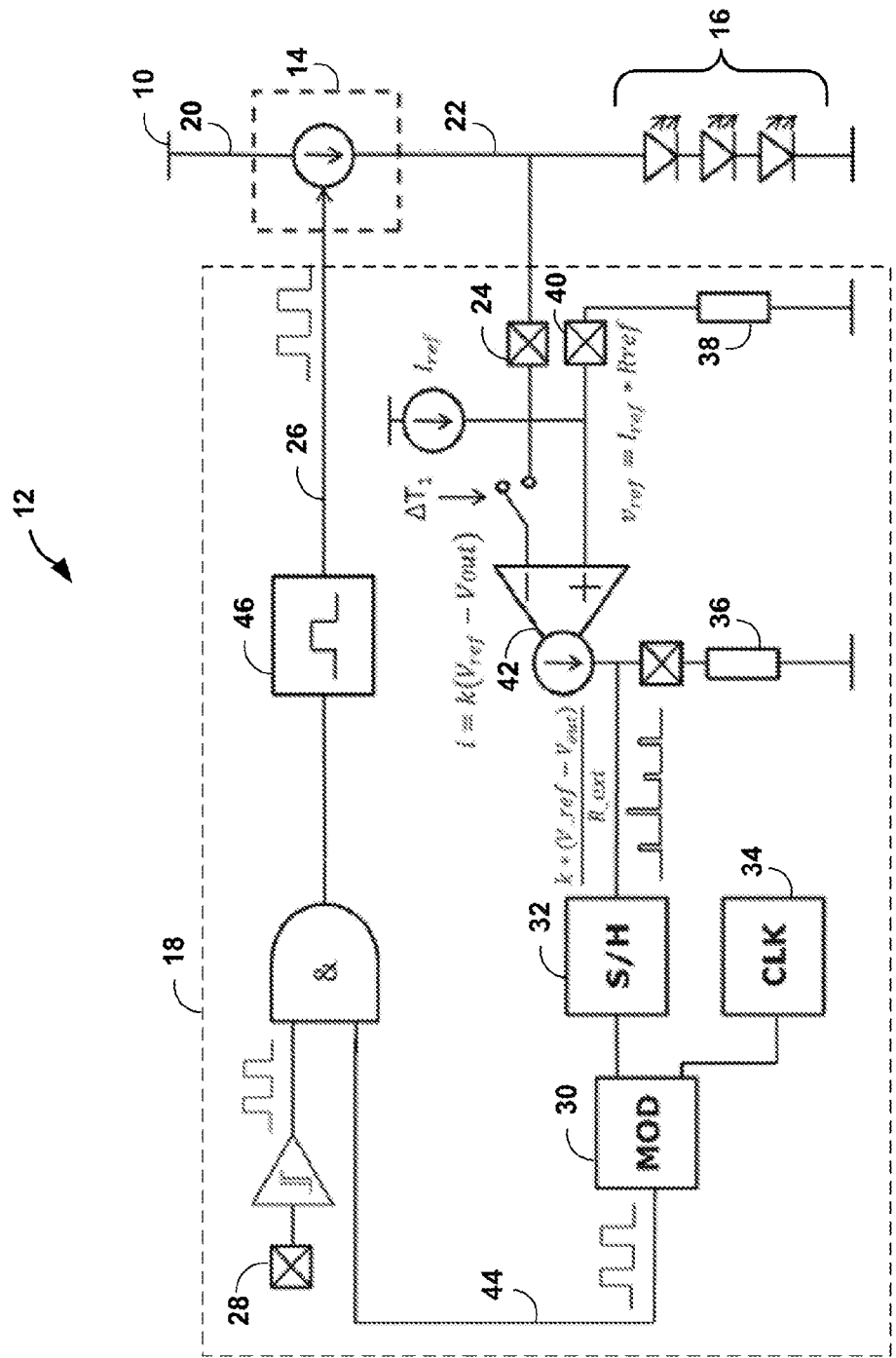
FIG. 2 is a block diagram illustrating an example implementation of the LED driver circuit of FIG. 1 in further detail in which the LED driver circuit performs temperature regulation of one or more LEDs.

FIG. 2 is a block diagram illustrating an example implementation of LED driver circuit 12 of FIG. 1 in further detail in which LED driver circuit 12 performs temperature regulation of one or more LEDs 16. In the example of FIG. 2, a power regulation circuit 14 performs DPWM of supply current 20 received from voltage supply 10 to create digital pulse-width modulated driver current 22 for driving LEDs 16. Temperature regulation circuit 18 measures an LED output voltage pin 24 indicating a voltage potential across LEDs 16. Based on this measurement, temperature regulation circuit 18 adjusts the duty cycle of supply current 22, thereby adjusting the average power provided to LEDs 16 while maintaining a constant peak supply current and performing temperature regulation of LEDs 16.

In some examples, temperature regulation circuit 18 includes a voltage comparator 42 for comparing the LED output voltage pin 24 against a reference voltage pin 40. Reference voltage pin 40 outputs a reference voltage created by supplying a constant current $I_{Ref}$ to a reference resistor $R_{ref}$ 38. In some examples, $R_{Ref}$ 38 is selected such that, when the temperature of LEDs 16 exceeds a predetermined maximum operating temperature, the voltage of LED output voltage pin 24 is less than reference voltage pin 40, but while the temperature of LEDs 16 is less than a predetermined operating temperature, the voltage of LED output voltage pin 24 is greater than reference voltage pin 40. In some examples, reference voltage pin 40 is provided as an external connection to LED driver circuit 12, while in other examples, reference voltage pin 40 is an internal component of LED driver circuit 12. In some examples, LED driver 12 is a multichannel LED driver, and includes one reference voltage pin 40 for each channel driven by LED driver 12.

Voltage comparator 42 samples LED output voltage pin 24 at a predetermined frequency $f_{dim}$. So as to ensure accurate measurements, voltage comparator 42 samples LED output voltage pin 24 only while the duty cycle of driver current 22 is delivering current. In the example of FIG. 2, $f_{dim}$ is approximately 400 Hz. However, typically, $f_{dim}$ is between 100-1000 Hz and is selected based on the inability of the human eye to perceive the frequency as flickering light.

Voltage comparator 42 compares LED output voltage pin 24 to reference voltage pin 40 and outputs a comparison current which flows through external resistor $R_{ext}$ 36. $R_{ext}$ 36 is selected so as to define the slope of the average current flowing through LEDs 16. For example, smaller values of $R_{ext}$ 36 causes a smaller slope of the average current flowing through LEDs 16, while higher values of $R_{ext}$ 36 causes a larger slope of the average current flowing through LEDs 16. Thus, $R_{ext}$ 36 is selected to configure the rate at which the duty cycle of driver current 22 is decreased in response to increasing temperature. In some examples, $R_{ext}$ 36 is an internal component of LED driver 12. In other examples, $R_{ext}$ 36 is an external component. In the latter case, $R_{ext}$ 36 may be changed at will to configure the profile of the thermal limitation of the load, for example, during testing or prototyping of an LED array and accompanying LED driver circuit.

Sample-and-Hold (S/H) circuit 32 samples the comparison current from voltage comparator 42 and outputs the sampled value, holding the output at a constant level for a specified minimum period of time. In some examples, S/H circuit 32 functions as an Analog-to-Digital Converter (ADC) to convert an analog comparison current from voltage comparator 42 into a discrete digital signal. S/H circuit 32 measures the time to hold a sample using clock signals from clock generator 34. Generally, S/H circuit 32 samples the comparison current at frequency $f_{dim}$.

Modulator 30 receives the held output of S/H circuit 32 and uses a clock signal from clock generator 34 to generate a modulated signal 44. In some examples, modulator 30 is implemented using a saw tooth wave generator, an oscillator, or a linear current regulator with a PWM engine. In some examples, modulated signal 44 is a signal modulated using DPWM. In some examples, modulated signal 44 may be a signal modulated using pulse-duration modulation or digital pulse density modulation. In some examples, modulated signal 44 is further conditioned by combining it with a generic dimming signal provided by channel dimming circuit 28. Modulated signal 44 is passed through filter 46, which imposes a minimum limit on modulated signal 44, to create a control signal 26 for adjusting the duty cycle of power regulation circuit 14. In some examples, power regulation circuit 14, in response to control signal 26, adjusts the duty cycle of a switch to transform supply current 20 into digitally modulated driver current 22. In other examples, control signal 26 directly adjusts the duty cycle of a switch to transform supply current 20 into a digitally modulated driver current 22. Digitally modulated driver current 22 flows through LEDs 16, supplying power to LEDs 16 at a constant peak current while having an adjustable average current.

Thus, in response to a measured voltage signal obtained from LED output voltage pin 24, temperature regulation circuit 18 adjusts, using pulse-width modulation, a duty cycle of a driver current 22 supplied to LEDs 16 so as to perform temperature regulation of LEDs 16 in a feedback loop. For example, when LEDs 16 increase in temperature, voltage comparator 42 indicates that a measured voltage signal obtained from LED output voltage pin 24 is less than a measured voltage signal obtained from reference voltage pin 40. Accordingly, modulator 30 will generate a signal causing power regulation circuit 14 to reduce the duty cycle of driver current 22. As another example, when LEDs 16 decrease in temperature, voltage comparator 42 indicates that a measured voltage signal obtained from LED output voltage pin 24 is greater than a measured voltage signal obtained from reference voltage pin 40. While this is the case, modulator 30 will generate a signal causing power regulation circuit 14 to increase the duty cycle of driver current 22. Thus, temperature regulation circuit 18 functions in a feedback loop so as to increase or decrease the duty cycle of driver current 22 so as to increase or decrease the average current delivered to LEDs 16, thereby adjusting the power consumption and the temperature of LEDs 16, to prevent LEDs 16 from overheating.

Accordingly, LED driver 12 may perform temperature monitoring and protection of LEDs 16 without using an expensive thermocouple by monitoring the voltage of LEDs 16 via voltage comparator 42 instead of the temperature, as is done by other devices. Also, temperature regulation circuit 12 performs direct measurements of LEDs 16. Therefore, there is no requirement that that LEDs 16 be positioned within the same circuit board in close proximity to LED driver 12 to receive accurate measurements.

Furthermore, because the driver current 22 is digitally modulated using pulse-width modulation, the actual current received by LEDs 16 remains either at a constant value or zero. Thus, temperature regulation circuit 18 increasing or decreasing the "on" time of the duty cycle of the driver current to adjust the average driver current delivered to LEDs 16, thus reducing the intensity of LEDs 16. In this way, LED driver 12 reduces the intensity of LEDs 16 yet continues to supply a constant peak current to LEDs 16, allowing LEDs 16 to operate within the specified design parameters and prevent chromaticity and color shift or other negative characteristics experienced when the intensity of LEDs 16 is reduced by reducing peak current. Therefore, LED driver 12 may use DPWM to adjust the average current received by LEDs 16 and thus the intensity of LEDs 16, so as to reduce power delivered to LEDs 16 and prevent thermal damage due to overheating.

The architecture of driver circuit 12 illustrated in FIG. 2 is shown for exemplary purposes only. The techniques as set forth in this disclosure may be implemented in the example driver circuit 12 of FIG. 2, as well as other types of driver circuits not described specifically herein. For example, in other configurations, temperature regulation circuit 18 is an external component to driver circuit 12. Nothing in this disclosure should be construed so as to limit the techniques of this disclosure to the example architecture illustrated by FIG. 2.

Figure 3:
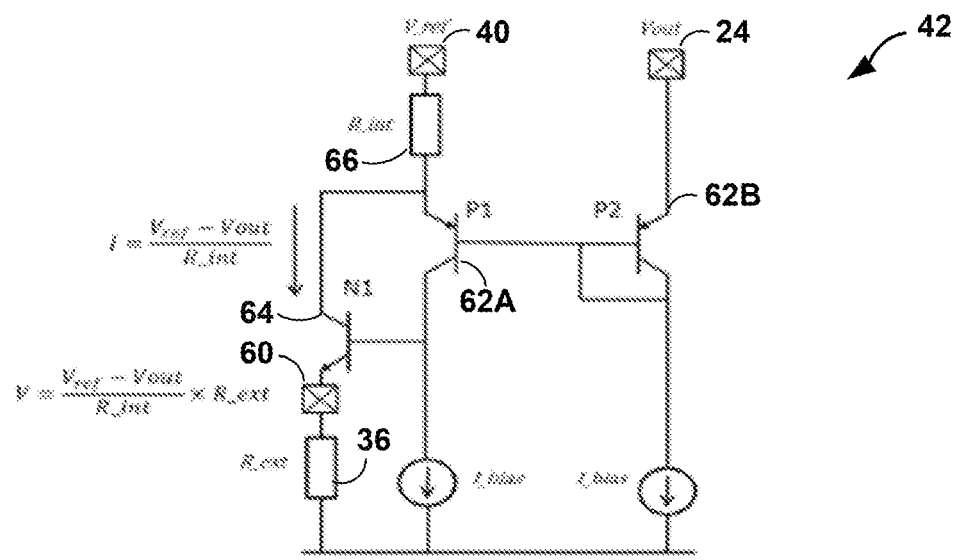
FIG. 3 depicts in further detail an example voltage comparator circuit of the LED driver circuit of FIG. 2 according to the techniques of the disclosure.
Figure 4:
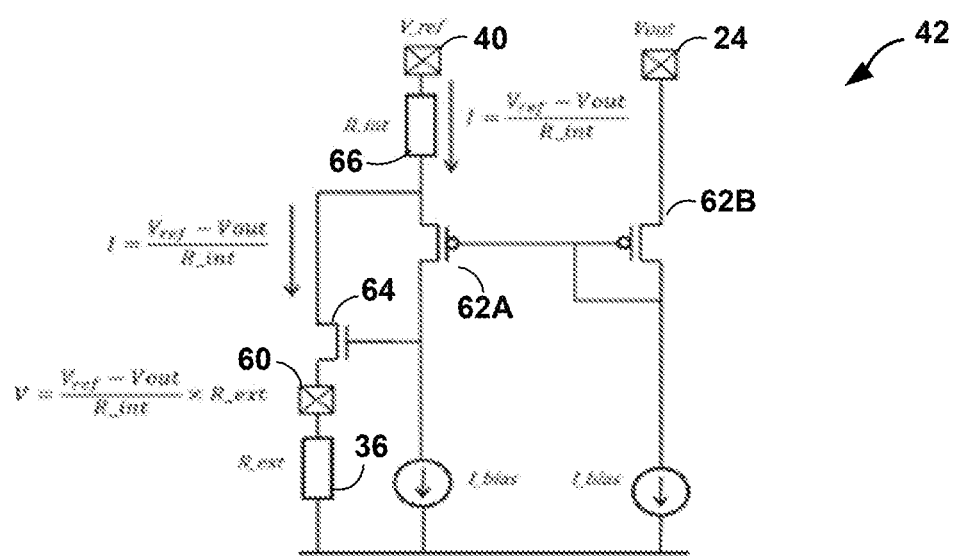
FIG. 4 depicts in further detail an example voltage comparator circuit of the LED driver circuit of FIG. 2 according to the techniques of the disclosure.

FIGS. 3 and 4 depict in further detail voltage comparator circuit 42 of FIG. 2 according to the techniques of the disclosure. FIG. 3 depicts voltage comparator circuit 42 as implemented using bipolar junction transistors (BJTs), while FIG. 4 depicts voltage comparator circuit 42 as implemented using metal-oxide-semiconductor field effect transistors (MOSFETs).

In the example of FIG. 3, two transistors 62A and 62B are biased at the same current, so both transistors 62A and 62B possess the same base-emitter voltage (Vu). The current I flowing into transistor 64 is defined by the following equation:

$$\frac{(V_{reference\ voltage\ pin\ 40} - V_{LED\ output\ voltage\ pin\ 24})}{R_{int\ 66}}$$

Current I flows into transistor 64 and is multiplied by external resistor $R_{ext}$ 36. This current is not flowing into 62A, so there is no mismatch between the $V_{bc}$ of 62A and 62B. The voltage at output pin 60 is defined by the following equation:

$$V_{output\ pin\ 60} = (V_{reference\ voltage\ pin\ 40} - V_{LED\ output\ voltage\ pin\ 24}) * \frac{R_{ext\ 36}}{R_{int\ 66}}$$

Reference voltage pin 40 is constant in temperature, while LED output voltage pin 24 decreases as a function of the increasing temperature of LEDs 16. Accordingly, the sampled voltage is temperature dependent. It increases with the temperature and is proportional to the external resistor $R_{ext}$ 36. In some examples, to improve precision, an external resistor may be used instead of internal resistor $R_{int}$ 66. In this case, the voltage at output pin 60 is not impacted by thermal mismatch between $R_{int}$ 66 and $R_{ext}$ 36. FIG. 4 functions in a similar fashion to FIG. 3, with the exception that transistors 62A, 62B, and 64 are MOSFET transistors instead of BJT transistors.

Thus, it may be seen that, in response to a measured voltage signal obtained from LED output voltage pin 24, voltage comparator 42 determines a change in temperature of LEDs 16. Further, voltage comparator 42 is configured so as to detect when the temperature of LEDs 16 rises above a predetermined maximum operating temperature, as established by selections of reference resistor $R_{Ref}$ 38. In this fashion, an LED driver circuit as disclosed herein may use the forward voltage potential across LEDs 16 to measure the temperature of LEDs 16 and perform temperature regulation of the LEDs. Accordingly, an LED driver as disclosed herein may perform temperature monitoring and protection of LEDs 16 without using an expensive thermocouple. Additionally, temperature regulation circuit 12 performs direct measurements of LEDs 16. Therefore, there is no requirement that that LEDs 16 be positioned within the same circuit board in close proximity to LED driver 12 to receive accurate measurements.

The architecture of voltage comparator circuit 42 illustrated in FIGS. 3 and 4 are shown for exemplary purposes only. The techniques as set forth in this disclosure may be implemented in the example voltage comparator circuit 42 of FIGS. 3 and 4, as well as other types of voltage comparator circuits not described specifically herein. Nothing in this disclosure should be construed so as to limit the techniques of this disclosure to the example architecture illustrated by FIGS. 3 and 4.

Figure 5:
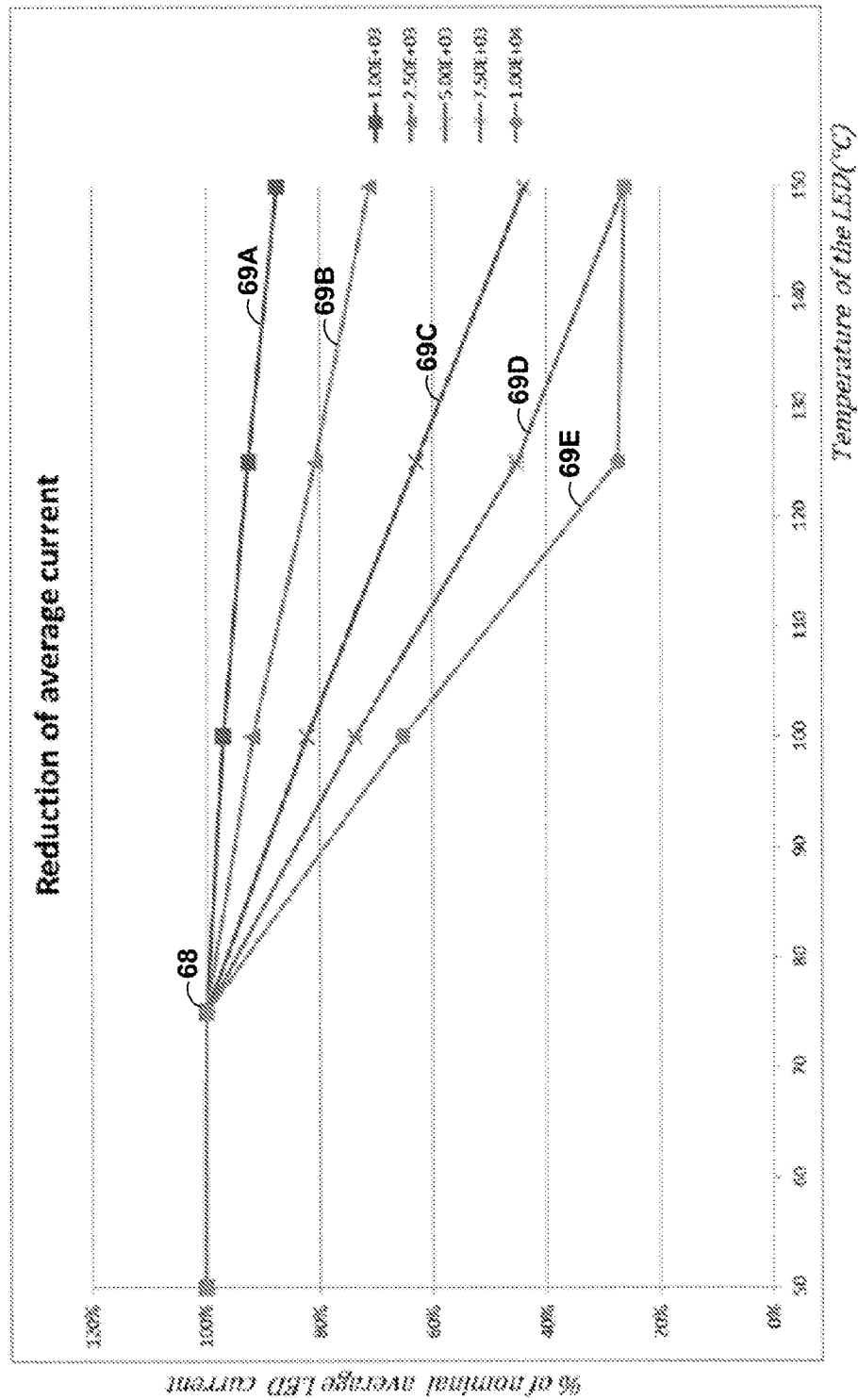
FIG. 5 is a graph illustrating example configurations for the voltage comparator circuit of FIG. 2 according to the techniques of the disclosure.

FIG. 5 is a graph illustrating example configurations for the voltage comparator circuit 42 of FIG. 2 in accordance with the techniques of the disclosure. As illustrated by FIG. 5, the duty cycle of driver current 22 remains at 100%, until it hits corner 68, at which point the duty cycle decreases with increasing temperature at a constant slope. Corner 68 is defined by selecting a value for reference resistor $R_{Ref}$ 38 to set a voltage at reference voltage pin 40 such that, when LEDs 16 surpass a predetermined maximum operating temperature, the voltage measured at LED output voltage pin 24 will be less than the voltage at reference voltage pin 40. By selecting a value of $R_{ext}$ 36, one sets the rate of decline in the duty cycle of driver current 22 in response to increasing temperature. In the example of FIG. 5, five different values for external resistor $R_{ext}$ 36 are depicted: 1 kiloOhm (kΩ) 69A, 2.5 kΩ 69B, 5 kΩ 69C, 7.5 kΩ 69D, and 10 kΩ 69E. As illustrated by FIG. 5, smaller values of $R_{ext}$ 36 cause a lower slope of the average current flowing through LEDs 16, while higher values of $R_{ext}$ 36 cause a higher slope of the average current flowing through LEDs 16. Thus, $R_{ext}$ 36 is selected to configure the rate at which temperature regulation circuit 18 will decrease driver current 22 in response to the increasing temperature of LEDs 16. This allows driver circuit 12 to be used in a wide variety of applications where LEDs 16 vary both in number and characteristics. Accordingly, an LED driver as disclosed herein may perform temperature regulation and protection for LEDs in almost any application, while still achieving the advantages of the techniques as disclosed herein.

The architecture of voltage comparator circuit 42 illustrated in FIG. 5 is shown for exemplary purposes only. The techniques as set forth in this disclosure may be implemented in the example voltage comparator circuit 42 of FIG. 5, as well as other types of voltage comparator circuits not described specifically herein. For example, numerous values of $R_{ext}$ 36 may be selected beyond the five values depicted herein. In some examples, the value of $R_{ext}$ 36 is selected so as to achieve the best results in a specific application in which LED driver 12 is used. In other examples, the value of $R_{ext}$ 36 is selected so as to satisfy a general purpose application and is optimized so as to work well in a wide variety of use cases. Nothing in this disclosure should be construed so as to limit the techniques of this disclosure to the example architecture illustrated by FIG. 5.

Figure 6:
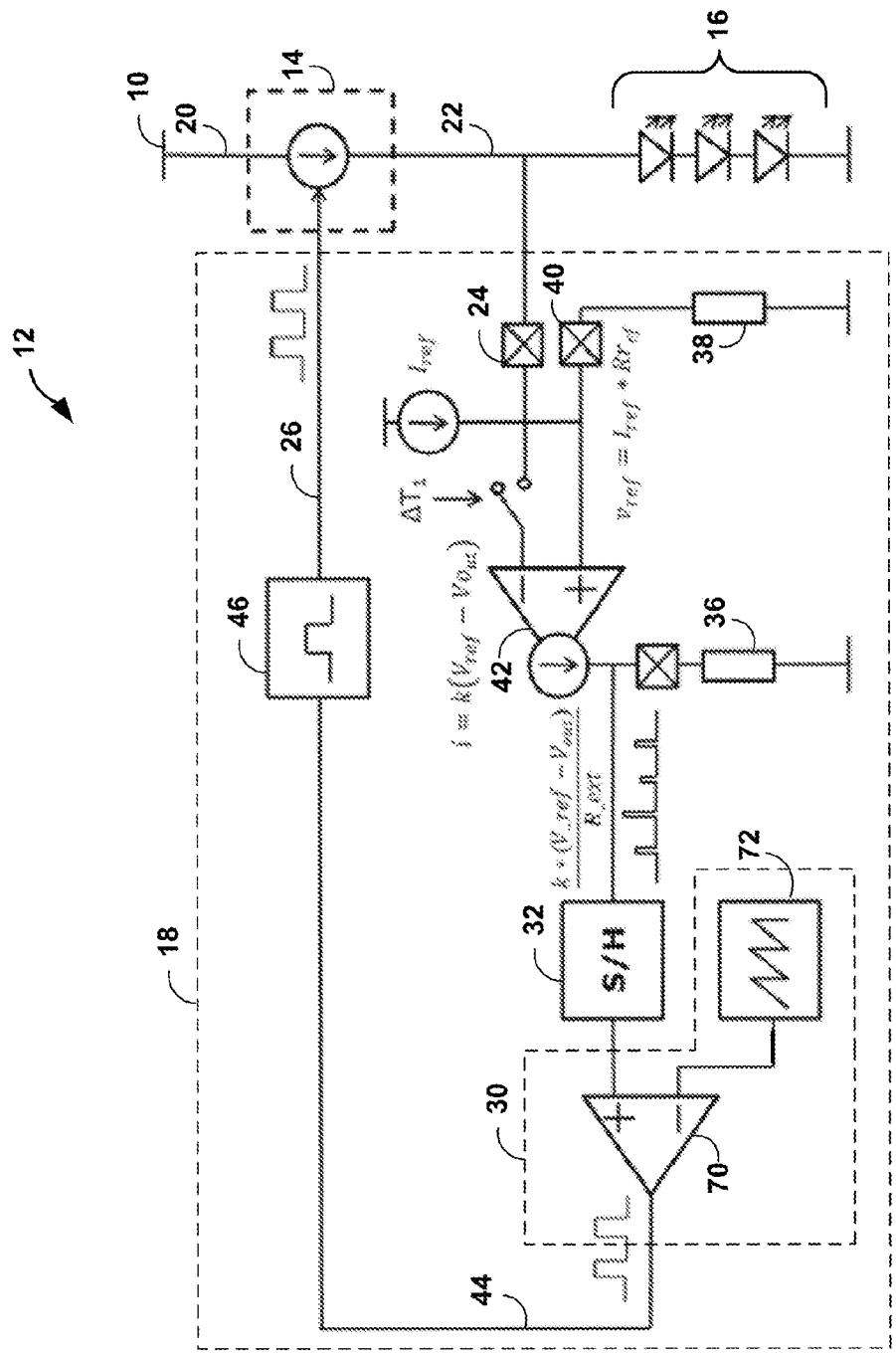
FIG. 6 is a block diagram illustrating an example implementation of the LED driver circuit of FIG. 2 in further detail in which an LED driver circuit performs temperature regulation of one or more LEDs.

FIG. 6 is a block diagram illustrating an example implementation of the LED driver circuit 12 of FIG. 2 in further detail in which LED driver circuit 12 performs temperature regulation of one or more LEDs 16. In general, LED driver circuit 12 of FIG. 6 functions substantially similar to the LED driver circuit 12 of FIG. 2. In the example of FIG. 6, modulator 30 performs pulse-width modulation. A comparator 70 compares a constant signal from S/H circuit 32 with a saw tooth wave provided by saw tooth generator 72. Comparator 70 outputs the resultant signal as a DPWM signal 44 to filter 46, which imposes a minimum pulse width on DPWM signal 44 to create DPWM control signal 26, which adjusts the duty cycle of driver current 22. In some examples, saw tooth generator 72 provides the saw tooth wave at a frequency of $f_{dim}$.

The maximum duty cycle of driver current 22 is 100%, when LEDs 16 are not in thermal limitation (e.g., when LEDs 16 are below a predetermined maximum operating temperature). The minimum duty cycle is defined by filter 46. To ensure that the LED output voltage 24 is sampled properly, the minimum duty cycle defined by filter 46 is greater than the sampling period of voltage comparator 42. For example, if this was not the case, then voltage comparator 42 may sample LED output voltage 24 during the "off" duty cycle of driver current 22, and incorrectly measure zero volts as the LED output voltage 24 instead of performing a measurement while LEDs 16 are receiving peak current.

Accordingly, LED driver 12 may perform temperature monitoring and protection of LEDs 16 without using an expensive thermocouple by monitoring the voltage of LEDs 16 via voltage comparator 42 instead of the temperature, as is done by other devices. Also, temperature regulation circuit 12 performs direct measurements of LEDs 16. Therefore, there is no requirement that that LEDs 16 be positioned within the same circuit board in close proximity to LED driver 12 to receive accurate measurements.

Furthermore, because the driver current 22 is digitally modulated using pulse-width modulation, the actual current received by LEDs 16 remains either at a constant value or zero. Thus, temperature regulation circuit 18 increasing or decreasing the "on" time of the duty cycle of the driver current to adjust the average driver current delivered to LEDs 16, thus reducing the intensity of LEDs 16. In this way, LED driver 12 reduces the intensity of LEDs 16 yet continues to supply a constant peak current to LEDs 16, allowing LEDs 16 to operate within the specified design parameters and prevent chromaticity and color shift or other negative characteristics experienced when the intensity of LEDs 16 is reduced by reducing peak current. Therefore, LED driver 12 may use DPWM to adjust the average current received by LEDs 16 and thus the intensity of LEDs 16, so as to reduce power delivered to LEDs 16 and prevent thermal damage due to overheating.

The architecture of LED driver circuit 12 illustrated in FIG. 6 is shown for exemplary purposes only. The techniques as set forth in this disclosure may be implemented in the example LED driver circuit 12 of FIG. 6, as well as other types of LED driver circuits not described specifically herein. Nothing in this disclosure should be construed so as to limit the techniques of this disclosure to the example architecture illustrated by FIG. 6.

Figure 7:
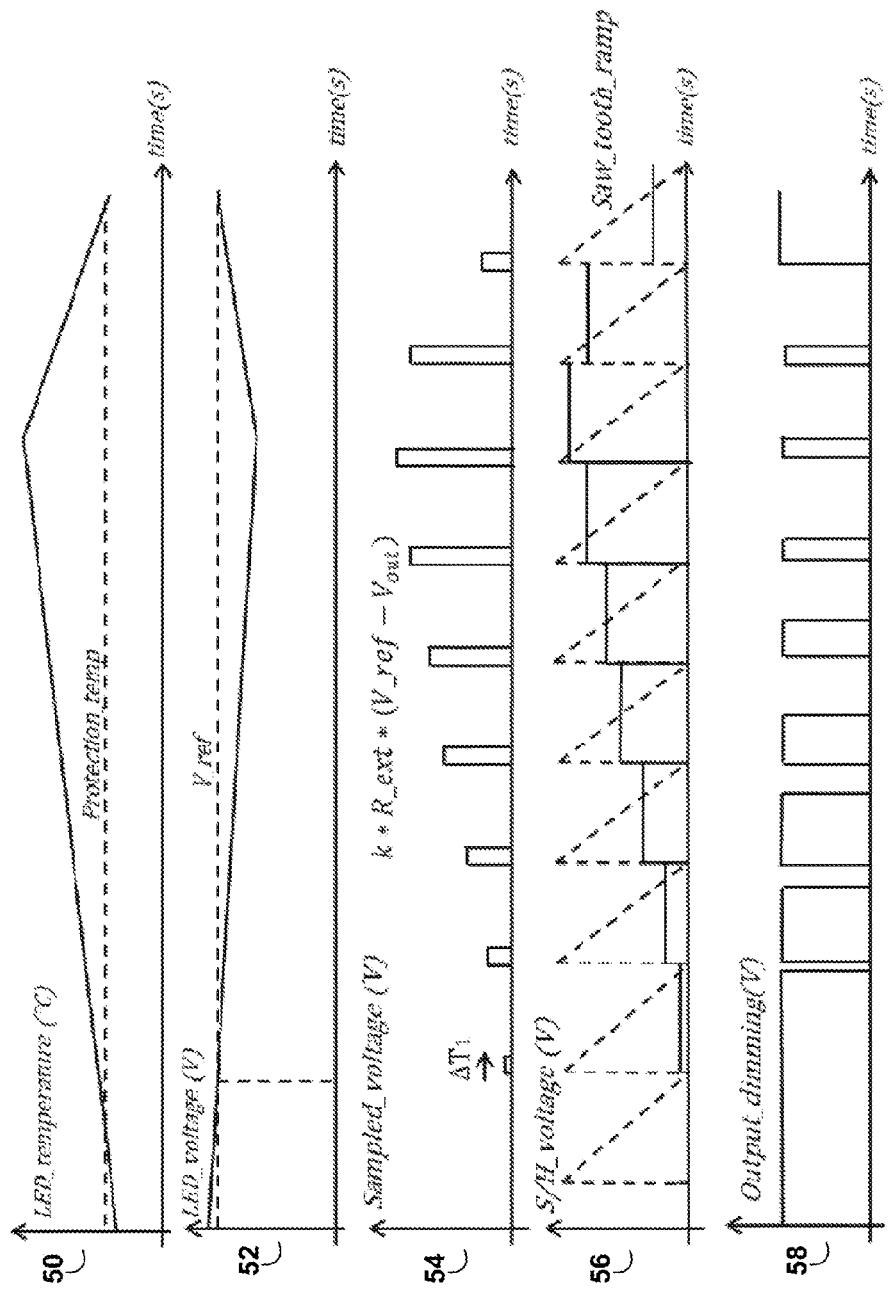
FIG. 7 is a diagram illustrating timing signals for an example LED driver circuit according to the techniques of the disclosure.

FIG. 7 is a diagram illustrating timing signals for the example LED driver circuit 12 of FIG. 6 according to the techniques of the disclosure. In the example of FIG. 7, graph 50 depicts the temperature of LEDs 16 over time, and graph 52 depicts the measured voltage signal obtained from LED output voltage pin 24 as a function of the temperature of LEDs 16. Graph 54 depicts the voltage signal provided by voltage comparator 42 as sampled by S/I circuit 32. Graph 56 depicts the output voltage of S/H circuit 32, as sampled and held by S/H circuit 32 (solid line), which is compared to the output of saw tooth generator 72 to create DPWM signal 44. Graph 58 depicts driver current 22 supplied to LEDs 16, wherein the duty cycle of driver current 22 is digitally modulated to regulate the temperature of LEDs 16 while still providing a constant peak current to LEDs 16.

As depicted in FIG. 7, as the temperature of LEDs 16 crosses a predetermined temperature protection cutoff, voltage comparator 42 indicates that a measured voltage signal obtained from LED output voltage pin 24 is less than a measured voltage signal obtained from reference voltage pin 40. At this point, comparator 70 generates a modulated control signal 26 causing temperature protection circuit 18 to reduce the duty cycle of the driver current 22 flowing into LEDs 16.

Accordingly, LED driver 12 may perform temperature monitoring and protection of LEDs 16 without using an expensive thermocouple by monitoring the voltage of LEDs 16 via voltage comparator 42 instead of the temperature, as is done by other devices. Also, temperature regulation circuit 12 performs direct measurements of LEDs 16. Therefore, there is no requirement that that LEDs 16 be positioned within the same circuit board in close proximity to LED driver 12 to receive accurate measurements.

Furthermore, because the driver current 22 is digitally modulated using pulse-width modulation, the actual current received by LEDs 16 remains either at a constant value or zero. Thus, temperature regulation circuit 18 increasing or decreasing the "on" time of the duty cycle of the driver current to adjust the average driver current delivered to LEDs 16, thus reducing the intensity of LEDs 16. In this way, LED driver 12 reduces the intensity of LEDs 16 yet continues to supply a constant peak current to LEDs 16, allowing LEDs 16 to operate within the specified design parameters and prevent chromaticity and color shift or other negative characteristics experienced when the intensity of LEDs 16 is reduced by reducing peak current. Therefore, LED driver 12 may use DPWM to adjust the average current received by LEDs 16 and thus the intensity of LEDs 16, so as to reduce power delivered to LEDs 16 and prevent thermal damage due to overheating.

The architecture of LED driver circuit 12 illustrated in FIG. 7 is shown for exemplary purposes only. The techniques as set forth in this disclosure may be implemented in the example LED driver circuit 12 of FIG. 7, as well as other types of LED driver circuits not described specifically herein. Nothing in this disclosure should be construed so as to limit the techniques of this disclosure to the example architecture illustrated by FIG. 7.

Figure 8:
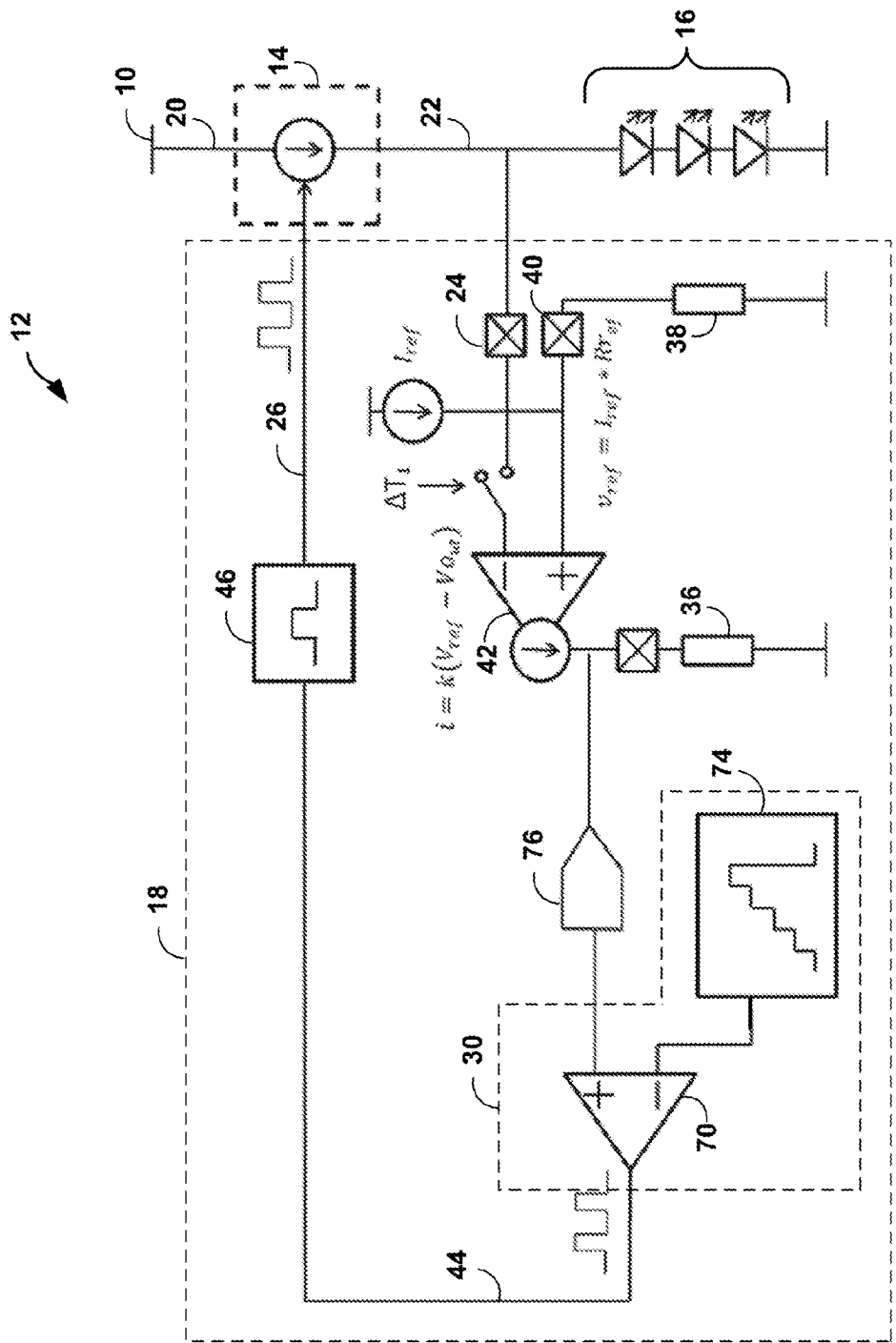
FIG. 8 is a block diagram illustrating an example implementation of the LED driver circuit of FIG. 2 in further detail in which an LED driver circuit performs temperature regulation of one or more LEDs.

FIG. 8 is a block diagram illustrating an example implementation of the LED driver circuit 12 of FIG. 2 in further detail in which LED driver circuit 12 performs temperature regulation of one or more LEDs 16. In general, LED driver circuit 12 of FIG. 8 functions substantially similar to the LED driver circuit 12 of FIG. 2. However, LED driver circuit 12 of FIG. 8 differs in several respects. First, instead of S/H circuit 32, driver LED driver circuit 12 of FIG. 8 includes ADC 76 to convert the analog signal from voltage comparator 42 into an digital value. Additionally, modulator 30 includes a comparator 70 that compares a digital signal from ADC 76 with a digital saw tooth wave provided by digital saw tooth generator 74. Comparator 70 outputs the resultant signal as a DPWM signal 44 to filter 46, which imposes a minimum pulse width on DPWM signal 44 to create DPWM control signal 26, which adjusts the duty cycle of driver current 22. In some examples, digital saw tooth generator 74 provides the digital saw tooth wave at a frequency of $f_{dim}$.

The example LED driver circuit 12 of FIG. 8 offers several advantages over the example LED driver circuit 12 of FIG. 6. First, using ADC 76 instead of S/H circuit 32 may limit the errors in signal detection due to the leakage current in capacitors used to implement S/H circuit 32. As a second advantage, the LED driver circuit 12 of FIG. 8 may require less circuit board space to implement because it does not require the large board space necessary to include capacitors used to implement S/H circuit 32.

Accordingly, LED driver 12 may perform temperature monitoring and protection of LEDs 16 without using an expensive thermocouple by monitoring the voltage of LEDs 16 via voltage comparator 42 instead of the temperature, as is done by other devices. Also, temperature regulation circuit 12 performs direct measurements of LEDs 16. Therefore, there is no requirement that that LEDs 16 be positioned within the same circuit board in close proximity to LED driver 12 to receive accurate measurements.

Furthermore, because the driver current 22 is digitally modulated using pulse-width modulation, the actual current received by LEDs 16 remains either at a constant value or zero. Thus, temperature regulation circuit 18 increasing or decreasing the "on" time of the duty cycle of the driver current to adjust the average driver current delivered to LEDs 16, thus reducing the intensity of LEDs 16. In this way, LED driver 12 reduces the intensity of LEDs 16 yet continues to supply a constant peak current to LEDs 16, allowing LEDs 16 to operate within the specified design parameters and prevent chromaticity and color shift or other negative characteristics experienced when the intensity of LEDs 16 is reduced by reducing peak current. Therefore, LED driver 12 may use DPWM to adjust the average current received by LEDs 16 and thus the intensity of LEDs 16, so as to reduce power delivered to LEDs 16 and prevent thermal damage due to overheating.

The architecture of LED driver circuit 12 illustrated in FIG. 8 is shown for exemplary purposes only. The techniques as set forth in this disclosure may be implemented in the example LED driver circuit 12 of FIG. 8, as well as other types of LED driver circuits not described specifically herein. Nothing in this disclosure should be construed so as to limit the techniques of this disclosure to the example architecture illustrated by FIG. 8.

Figure 9:
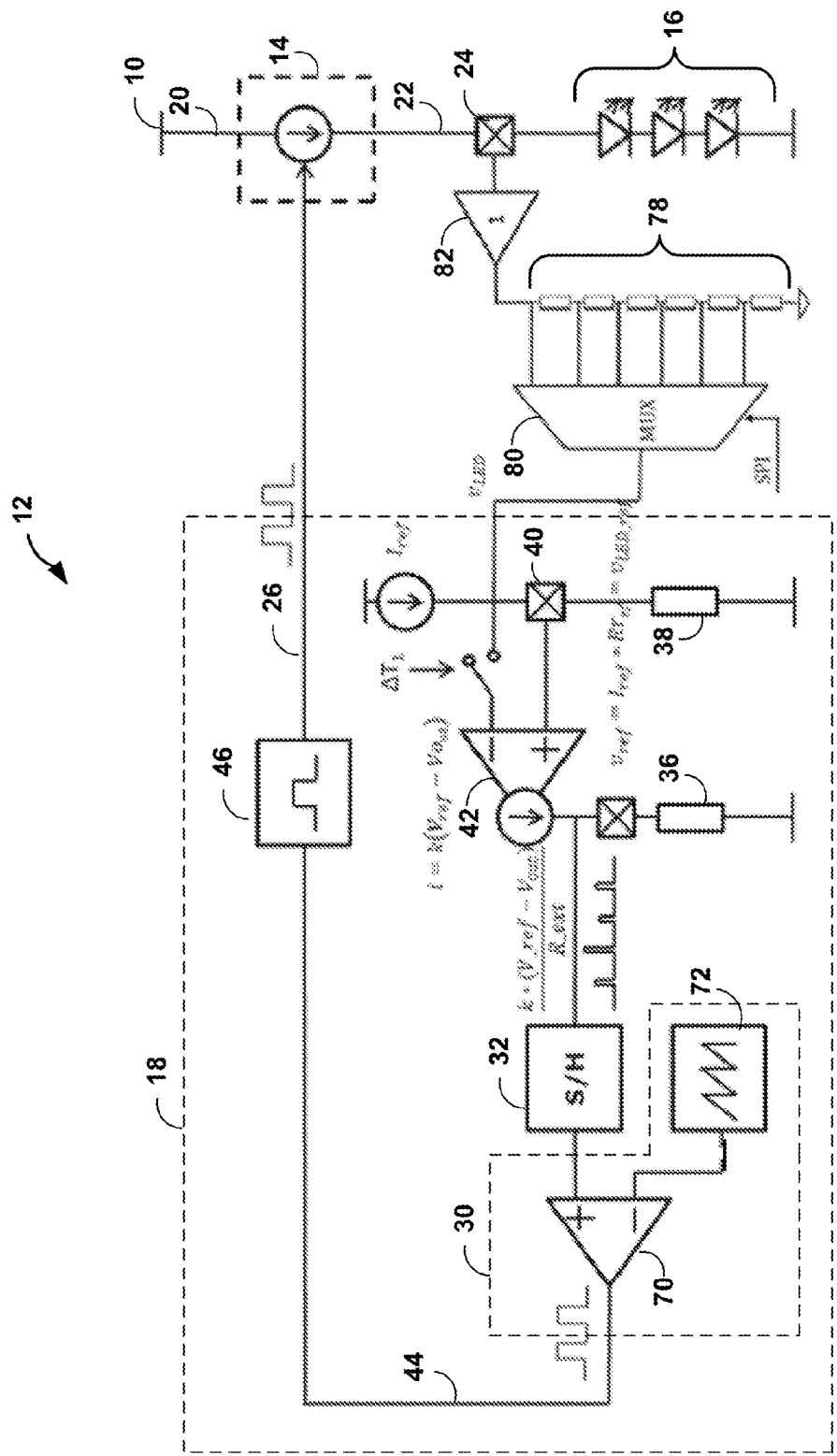
FIG. 9 is a block diagram illustrating an example implementation of the LED driver circuit of FIG. 6 in further detail in which an LED driver circuit performs temperature regulation of one or more LEDs.

FIG. 9 is a block diagram illustrating an example implementation of the LED driver circuit 12 of FIG. 6 in further detail in which LED driver circuit 12 performs temperature regulation of one or more LEDs 16. In general, LED driver circuit 12 of FIG. 9 functions substantially similar to the LED driver circuit 12 of FIG. 6.

In the example of FIG. 9, a user specifies the number of LEDs within LEDs 16. In some examples, the user specifies the number of LEDs by communicating with LED driver circuit 12 via a digital communication bus, such as a Serial Peripheral Interface (SPI). LED output voltage pin 24 is connected to LED driver circuit 12 via a buffer 82 and a multiplexor ("MUX") 80. A portion of voltage divider 78 is selected by the user such that the output of MUX 80 is not the forward voltage of the series of LEDs 16, but the forward voltage of a single LED. Thus, reference resistor $R_{Ref}$ 38 is selected to match the voltage of a single LED. If the number of LEDs 16 changes, $R_{Ref}$ 38 remains constant, and the user selects a new portion of voltage divider 78 such that the output of MUX 80 is the forward voltage of a single LED. Accordingly, the LED driver circuit 12 of FIG. 9 accommodates a wide variety of LED configurations without changing reference resistor $R_{Ref}$ 38 each time the configuration of LEDs 16 changes. Such an LED driver circuit 12 may be useful in testing different LED configurations or as a general purpose LED driver suitable for a wide variety of LED applications.

Accordingly, LED driver 12 may perform temperature monitoring and protection of LEDs 16 without using an expensive thermocouple by monitoring the voltage of LEDs 16 via voltage comparator 42 instead of the temperature, as is done by other devices. Also, temperature regulation circuit 12 performs direct measurements of LEDs 16. Therefore, there is no requirement that that LEDs 16 be positioned within the same circuit board in close proximity to LED driver 12 to receive accurate measurements.

Furthermore, because the driver current 22 is digitally modulated using pulse-width modulation, the actual current received by LEDs 16 remains either at a constant value or zero. Thus, temperature regulation circuit 18 increasing or decreasing the "on" time of the duty cycle of the driver current to adjust the average driver current delivered to LEDs 16, thus reducing the intensity of LEDs 16. In this way, LED driver 12 reduces the intensity of LEDs 16 yet continues to supply a constant peak current to LEDs 16, allowing LEDs 16 to operate within the specified design parameters and prevent chromaticity and color shift or other negative characteristics experienced when the intensity of LEDs 16 is reduced by reducing peak current. Therefore, LED driver 12 may use DPWM to adjust the average current received by LEDs 16 and thus the intensity of LEDs 16, so as to reduce power delivered to LEDs 16 and prevent thermal damage due to overheating.

The architecture of LED driver circuit 12 illustrated in FIG. 9 is shown for exemplary purposes only. The techniques as set forth in this disclosure may be implemented in the example LED driver circuit 12 of FIG. 9, as well as other types of LED driver circuits not described specifically herein. For example, the LED driver circuit of FIG. 8 may be modified so as to include a programmable MUX and voltage divider as described herein. Nothing in this disclosure should be construed so as to limit the techniques of this disclosure to the example architecture illustrated by FIG. 9.

Figure 10:
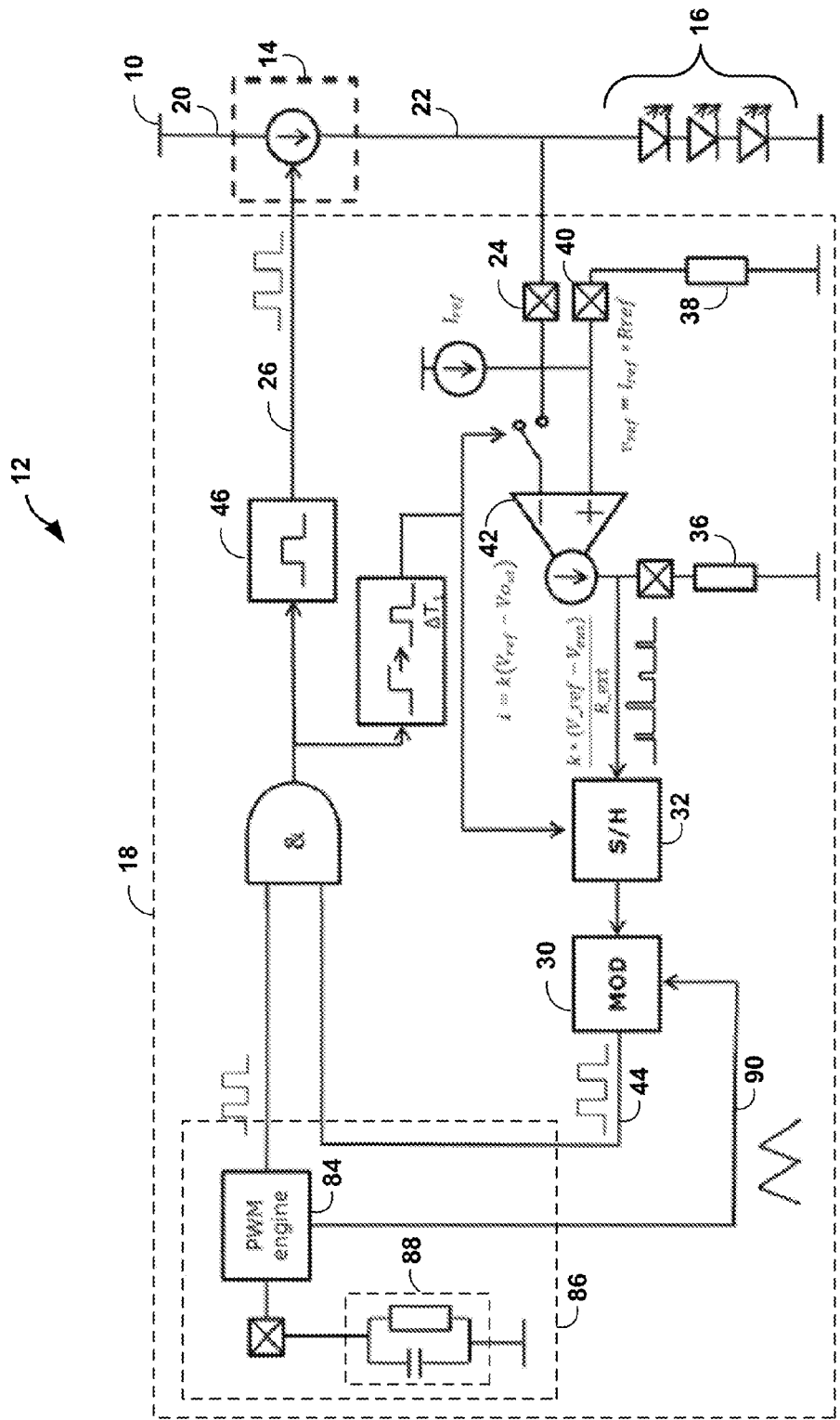
FIG. 10 is a block diagram illustrating an example implementation of the LED driver circuit of FIG. 2 in further detail in which an LED driver circuit performs temperature regulation of one or more LEDs.

FIG. 10 is a block diagram illustrating an example implementation of the LED driver circuit 12 of FIG. 1 in further detail in which an LED driver circuit 12 performs temperature regulation of one or more LEDs 16. In contrast to the LED driver circuit 12 of FIG. 2, LED driver circuit 12 of FIG. 10 does not require an internal clock 34.

The LED driver circuit of FIG. 10 includes a linear current regulator 86 with a PWM engine 84. No clock, oscillators, or saw tooth generators are required to implement temperature protection circuit 18 in this example. PWM engine 84 provides a dimming control signal 26 by charging or discharging a resistor-capacitor (RC) network 88. In some examples, RC network 88 is an internal component of LED driver 12, while in other examples, RC network 88 is external to LED driver 12. Modulator 30 receives an analog PWMI ramp signal 90 from PWM engine 84 and the output of S/H circuit 32. Modulator 30 compares these two signals and generates a digital PWM signal 44, which controls a duty cycle of driver current 22.

The example LED driver circuit 12 of FIG. 10 reuses the analog PWMI ramp signal 90 in the modulator. First, it is compared to the output of S/H circuit 32 and it used to provide the digital signal that switches the current as the temperature rises. Further, the rising edge of the analog PWMI ramp signal 90 is used to create a pulse that triggers the acquisition of the output voltage by S/H circuit 32. Accordingly, the example LED driver circuit 12 of FIG. 10 does not require a clock or oscillator to perform temperature management of LEDs 16 according to the techniques as disclosed herein.

As discussed above, the minimum duty cycle of driver current 22 is defined by filter 46. To ensure that the LED output voltage 24 is sampled properly, the minimum duty cycle defined by filter 46 is greater than the sampling period of voltage comparator 42 and S/H circuit 32. For example, if this was not the case, then voltage comparator 42 or S/H circuit 32 may sample LED output voltage 24 during the "off" duty cycle of driver current 22, and incorrectly measure zero volts as the LED output voltage 24 instead of performing a measurement while LEDs 16 are receiving peak current. Here, the proper acquisition of LED output voltage 24 is guaranteed because the pulse for the sampling activity is generated at the rising edge of the digital signal that is switching on/off the power stage.

Accordingly, LED driver 12 may perform temperature monitoring and protection of LEDs 16 without using an expensive thermocouple by monitoring the voltage of LEDs 16 via voltage comparator 42 instead of the temperature, as is done by other devices. Also, temperature regulation circuit 12 performs direct measurements of LEDs 16. Therefore, there is no requirement that that LEDs 16 be positioned within the same circuit board in close proximity to LED driver 12 to receive accurate measurements.

Furthermore, because the driver current 22 is digitally modulated using pulse-width modulation, the actual current received by LEDs 16 remains either at a constant value or zero. Thus, temperature regulation circuit 18 increasing or decreasing the "on" time of the duty cycle of the driver current to adjust the average driver current delivered to LEDs 16, thus reducing the intensity of LEDs 16. In this way, LED driver 12 reduces the intensity of LEDs 16 yet continues to supply a constant peak current to LEDs 16, allowing LEDs 16 to operate within the specified design parameters and prevent chromaticity and color shift or other negative characteristics experienced when the intensity of LEDs 16 is reduced by reducing peak current. Therefore, LED driver 12 may use DPWM to adjust the average current received by LEDs 16 and thus the intensity of LEDs 16, so as to reduce power delivered to LEDs 16 and prevent thermal damage due to overheating.

The architecture of LED driver circuit 12 illustrated in FIG. 10 is shown for exemplary purposes only. The techniques as set forth in this disclosure may be implemented in the example LED driver circuit 12 of FIG. 10, as well as other types of LED driver circuits not described specifically herein. Nothing in this disclosure should be construed so as to limit the techniques of this disclosure to the example architecture illustrated by FIG. 10.

Figure 11:
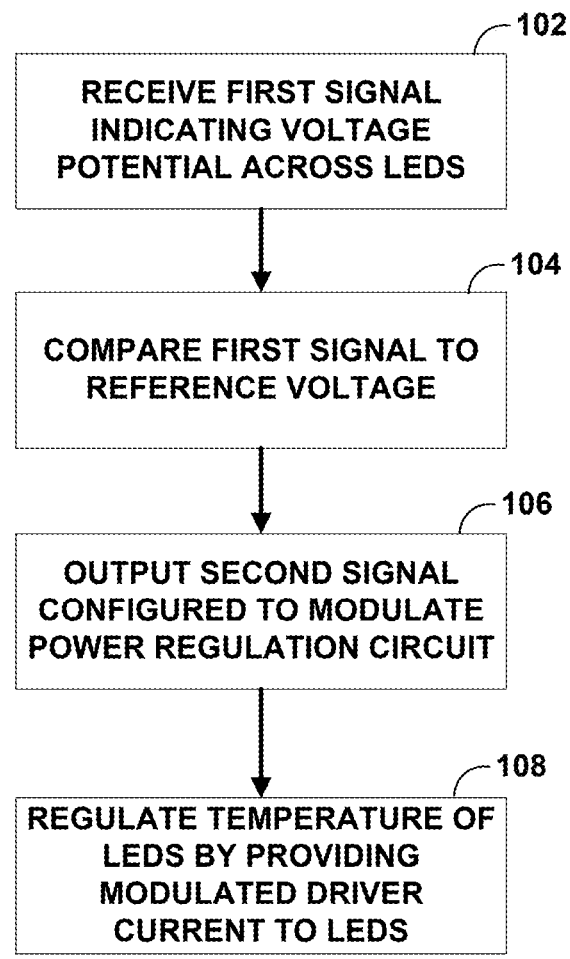
FIG. 11 is a flowchart illustrating an example method for performing the techniques of the disclosure.

FIG. 11 is a flowchart illustrating an example method for performing the techniques of the disclosure. FIG. 11 is described with reference to the example LED driver circuit 12 of FIG. 2. However, FIG. 11 is equally applicable to the example LED driver circuits of FIGS. 6 and 8-10.

In the example method of FIG. 11, temperature protection circuit 18 of LED driver 18 receives a LED voltage output signal 24 which indicates the voltage potential across LEDs 16 (102). Voltage comparator 42 compares LED voltage output signal 24 to a reference voltage signal 40 (104). Voltage comparator 42 outputs a comparison current indicating the difference between LED voltage output signal 24 and the reference voltage signal 40 to S/H circuit 32. In some examples, when the temperature of LEDs 16 exceeds a predetermined maximum operating temperature, the voltage of LED output voltage pin 24 is less than reference voltage pin 40, but while the temperature of LEDs 16 is less than a predetermined operating temperature, the voltage of LED output voltage pin 24 is greater than reference voltage pin 40. S/H circuit 32 samples the comparison current from voltage comparator 42 and outputs the sampled-and-held value to modulator 30.

In response to the comparison of the LED voltage output signal 24 to the reference voltage signal 40, modulator 30 outputs a modulated signal 44 configured to dynamically modulate power regulation circuit 14 (106). In some examples, the modulated signal 44 modulates a duty cycle of power regulation circuit 14. In some examples, modulator 30 is implemented using a saw tooth wave generator, an oscillator, or a linear current regulator with a PWM engine. In some examples, modulated signal 44 is a signal modulated using DPWM. In other examples, modulated signal 44 is a signal modulated using digital pulse-duration modulation or digital pulse density modulation. In some examples, modulated signal 44 is further conditioned by combining it with a generic dimming signal provided by channel dimming circuit 28 to create control signal 26.

Power regulation circuit 14, in response to control signal 26, performs temperature regulation of LEDs 16 by delivering the modulated driver current 22 to LEDs 16 (108). Digitally modulated driver current 22 flows through LEDs 16, supplying power to LEDs 16 at a constant peak current. By adjusting the duration of the duty cycle of driver current 22, temperature regulation circuit 18 adjusts the average current delivered to LEDs 16, thereby adjusting the intensity and power consumption of LEDs 16. By reducing the power consumption of LEDs 16 in response to the LED voltage output signal 24 indicating a temperature of LEDs 16, temperature regulation circuit 18 may regulate the temperature of LEDs 16.

Accordingly, LED driver 12 may perform temperature monitoring and protection of LEDs 16 without using an expensive thermocouple by monitoring the voltage of LEDs 16 via voltage comparator 42 instead of the temperature, as is done by other devices. Also, temperature regulation circuit 12 performs direct measurements of LEDs 16. Therefore, there is no requirement that that LEDs 16 be positioned within the same circuit board in close proximity to LED driver 12 to receive accurate measurements.

Furthermore, because the driver current 22 is digitally modulated using pulse-width modulation, the actual current received by LEDs 16 remains either at a constant value or zero. Thus, temperature regulation circuit 18 increasing or decreasing the "on" time of the duty cycle of the driver current to adjust the average driver current delivered to LEDs 16, thus reducing the intensity of LEDs 16. In this way, LED driver 12 reduces the intensity of LEDs 16 yet continues to supply a constant peak current to LEDs 16, allowing LEDs 16 to operate within the specified design parameters and prevent chromaticity and color shift or other negative characteristics experienced when the intensity of LEDs 16 is reduced by reducing peak current. Therefore, LED driver 12 may use DPWM to adjust the average current received by LEDs 16 and thus the intensity of LEDs 16, so as to reduce power delivered to LEDs 16 and prevent thermal damage due to overheating.

The following examples may illustrate one or more aspects of the disclosure.

Example 1

A method comprising: receiving, by a temperature regulation circuit of a light-emitting diode (LED) driver, a first signal indicating a voltage potential across a plurality of LEDs; and in response to the received first signal, outputting, by the temperature regulation circuit, a second signal configured to regulate temperature of the plurality of LEDs by dynamically modulating a duty cycle of a switch delivering current to the plurality of LEDs.

Example 2

The method of example 1, wherein dynamically modulating the duty cycle of the switch comprises dynamically modulating, using pulse-width modulation, the duty cycle of the switch.

Example 3

The method according to any of examples 1-2, wherein outputting the second signal configured to regulate temperature of the plurality of LEDs by dynamically modulating the duty cycle of the switch delivering current to the plurality of LEDs comprises outputting a second signal configured to regulate temperature of the plurality of LEDs by decreasing the duty cycle of the switch delivering current to the plurality of LEDs.

Example 4

The method according to any of examples 1-3, further comprising: comparing the first signal indicating the voltage potential across the plurality of LEDs to a reference voltage; and outputting, based on the comparison between the first signal indicating the voltage potential across the plurality of LEDs and the reference voltage, a first indication that a temperature of the plurality of LEDs is greater than a maximum operating temperature.

Example 5

The method according to any of examples 1-4, wherein outputting the second signal configured to regulate temperature of the plurality of LEDs by dynamically modulating the duty cycle of the switch delivering current to the plurality of LEDs comprises: comparing the first indication to a saw tooth waveform; and outputting, based on the comparison between the first indication and the saw tooth waveform, the second signal configured to regulate temperature of the plurality of LEDs by dynamically modulating the duty cycle of the switch delivering current to the plurality of LEDs.

Example 6

The method according to any of examples 1-5, wherein outputting the second signal configured to regulate temperature of the plurality of LEDs by dynamically modulating the duty cycle of the switch delivering current to the plurality of LEDs comprises: comparing the first indication to a signal generated by a pulse-width modulation (PWM) engine; and outputting, based on the comparison between the first indication and the signal generated by the PWM engine, the second signal configured to regulate temperature of the plurality of LEDs by dynamically modulating the duty cycle of the switch delivering current to the plurality of LEDs.

Example 7

The method according to any of examples 1-6, further comprising: receiving an indication of the number of the plurality of LEDs; determining, based on the indication of the number of the plurality of LEDs and the voltage potential across the plurality of LEDs, the voltage potential across one LED of the plurality of LEDs; comparing the voltage potential across the one LED of the plurality of LEDs to a reference voltage: and outputting, based on the comparison between the voltage potential across the one LED of the plurality of LEDs and the reference voltage, a first indication that a temperature of the at least one LED is greater than a maximum operating temperature.

Example 8

The method according to any of examples 1-7, wherein outputting the second signal configured to regulate temperature of the plurality of LEDs by dynamically modulating the duty cycle of the switch delivering current to the plurality of LEDs comprises: determining that the second signal is configured to decrease the duty cycle of the switch delivering current to the plurality of LEDs below a minimum duty cycle; adjusting, based on the determination, the second signal to decrease the duty cycle of the switch delivering current to the plurality of LEDs to the minimum duty cycle; and outputting the adjusted second signal configured to regulate temperature of the plurality of LEDs by decreasing the duty cycle of the switch delivering current to the plurality of LEDs to the minimum duty cycle.

Example 9

A temperature regulation circuit of a light emitting diode (LED) driver configured to: receive a first signal indicating a voltage potential across a plurality of LEDs; and in response to the received first signal, output a second signal configured to regulate temperature of the plurality of LEDs by dynamically modulating a duty cycle of a switch delivering current to the plurality of LEDs.

Example 10

The temperature regulation circuit of example 9, wherein dynamically modulating the duty cycle of the switch comprises dynamically modulating, using pulse-width modulation, the duty cycle of the switch.

Example 11

The temperature regulation circuit according to any of examples 9-10, wherein the temperature regulation circuit configured to output the second signal configured to regulate temperature of the plurality of LEDs by dynamically modulating the duty cycle of the switch delivering current to the plurality of LEDs is further configured to output a second signal configured to regulate temperature of the plurality of LEDs by decreasing the duty cycle of the switch delivering current to the plurality of LEDs.

Example 12

The temperature regulation circuit according to any of examples 9-11, wherein the temperature regulation circuit is configured to: compare the first signal indicating the voltage potential across the plurality of LEDs to a reference voltage; and output, based on the comparison between the first signal indicating the voltage potential across the plurality of LEDs and the reference voltage, a first indication that a temperature of the plurality of LEDs is greater than a maximum operating temperature.

Example 13

The temperature regulation circuit according to any of examples 9-12, wherein the temperature regulation circuit configured to output the second signal configured to regulate temperature of the plurality of LEDs by dynamically modulating the duty cycle of the switch delivering current to the plurality of LEDs is further configured to: compare the first indication to a saw tooth waveform; and output, based on the comparison between the first indication and the saw tooth waveform, the second signal configured to regulate temperature of the plurality of LEDs by dynamically modulating the duty cycle of the switch delivering current to the plurality of LEDs.

Example 14

The temperature regulation circuit according to any of examples 9-13, wherein the temperature regulation circuit configured to output the second signal configured to regulate temperature of the plurality of LEDs by dynamically modulating the duty cycle of the switch delivering current to the plurality of LEDs is further configured to: compare the first indication to a signal generated by a pulse-width modulation (PWM) engine; and output, based on the comparison between the first indication and the signal generated by the PWM engine, the second signal configured to regulate temperature of the plurality of LEDs by dynamically modulating the duty cycle of the switch delivering current to the plurality of LEDs.

Example 15

The temperature regulation circuit according to any of examples 9-14, wherein the temperature regulation circuit is further configured to: receive an indication of the number of the plurality of LEDs; determine, based on the indication of the number of the plurality of LEDs and the voltage potential across the plurality of LEDs, the voltage potential across one LED of the plurality of LEDs; compare the voltage potential across the one LED of the plurality of LEDs to a reference voltage; and output, based on the comparison between the voltage potential across the one LED of the plurality of LEDs and the reference voltage, a first indication that a temperature of the at least one LED is greater than a maximum operating temperature.

Example 16

The temperature regulation circuit according to any of examples 9-15, wherein the temperature regulation circuit configured to output the second signal configured to regulate temperature of the plurality of LEDs by dynamically modulating the duty cycle of the switch delivering current to the plurality of LEDs is further configured to: determine that the second signal is configured to decrease the duty cycle of the switch delivering current to the plurality of LEDs below a minimum duty cycle; adjust, based on the determination, the second signal to decrease the duty cycle of the switch delivering current to the plurality of LEDs to the minimum duty cycle; and output the adjusted second signal configured to regulate temperature of the plurality of LEDs by decreasing the duty cycle of the switch delivering current to the plurality of LEDs to the minimum duty cycle.

Example 17

A system comprising: a plurality of light-emitting diodes (LEDs) configured to output a first signal indicating a voltage potential across the plurality of LEDs; and a light-emitting diode (LED) driver comprising: a temperature regulation circuit configured to: receive the first signal indicating the voltage potential across the plurality of LEDs; and in response to the received first signal, output a second signal configured to regulate temperature of the plurality of LEDs by dynamically modulating a duty cycle of a switch delivering current to the plurality of LEDs; and the switch, configured to deliver current to the plurality of LEDs according to the duty cycle defined by the second signal.

Example 18

The system of example 17, wherein dynamically modulating the duty cycle of the switch comprises dynamically modulating, using pulse-width modulation, the duty cycle of the switch.

Example 19

The system according to any of examples 17-18, wherein the temperature regulation circuit configured to output the second signal configured to regulate temperature of the plurality of LEDs by dynamically modulating the duty cycle of the switch delivering current to the plurality of LEDs is further configured to output a second signal configured to regulate temperature of the plurality of LEDs by decreasing the duty cycle of the switch delivering current to the plurality of LEDs.

Example 20

The system according to any of examples 17-19, wherein the temperature regulation circuit is configured to: compare the first signal indicating the voltage potential across the plurality of LEDs to a reference voltage; and output, based on the comparison between the first signal indicating the voltage potential across the plurality of LEDs and the reference voltage, a first indication that a temperature of the plurality of LEDs is greater than a maximum operating temperature.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

Various examples have been described. These and other examples are within the scope of the following claims.

What is claimed is:

1. A method comprising:
   receiving, by a temperature regulation circuit of a light-emitting diode (LED) driver, a first signal indicating a voltage potential across a plurality of LEDs;
   calculating, by the temperature regulation circuit and based on the first signal indicating the voltage potential across the plurality of LEDs, a temperature of the plurality of LEDs; and
   outputting, by the temperature regulation circuit and based on the calculated temperature of the plurality of the LEDs, a second signal configured to regulate the temperature of the plurality of LEDs by dynamically modulating a current regulator delivering current to the plurality of LEDs.

2. The method of claim 1, wherein the second signal configured to regulate the temperature of the plurality of LEDs by dynamically modulating the current regulator is further configured to regulate the temperature of the plurality of LEDs by dynamically modulating, using pulse-width modulation, a duty cycle of a switch of the current regulator.

3. The method of claim 2, wherein the second signal configured to regulate the temperature of the plurality of LEDs by dynamically modulating, using pulse-width modulation, the duty cycle of the switch of the current regulator is further configured to regulate the temperature of the plurality of LEDs by decreasing the duty cycle of the switch of the current regulator.

4. The method of claim 1, wherein calculating the temperature of the plurality of LEDs comprises:
   comparing the first signal indicating the voltage potential across the plurality of LEDs to a reference voltage; and
   outputting, based on the comparison between the first signal indicating the voltage potential across the plurality of LEDs and the reference voltage, a first indication that a temperature of the plurality of LEDs is greater than a maximum operating temperature.

5. The method of claim 4, wherein calculating the temperature of the plurality of LEDs comprises comparing the first indication to a saw tooth waveform; and
   wherein outputting, based on the calculated temperature, the second signal configured to regulate the temperature of the plurality of LEDs by dynamically modulating a current regulator delivering current to the plurality of LEDs comprises outputting, based on the comparison between the first indication and the saw tooth waveform, the second signal configured to regulate the temperature of the plurality of LEDs by dynamically modulating the current regulator delivering current to the plurality of LEDs.

6. The method of claim 4, wherein calculating the temperature of the plurality of LEDS comprises comparing the first indication to a signal generated by a pulse-width modulation (PWM) engine; and
   wherein outputting, based on the calculated temperature, the second signal configured to regulate the temperature of the plurality of LEDs by dynamically modulating a current regulator delivering current to the plurality of LEDs comprises outputting, based on the comparison between the first indication and the signal generated by the PWM engine, the second signal configured to regulate the temperature of the plurality of LEDs by dynamically modulating the current regulator delivering current to the plurality of LEDs.

7. The method of claim 1, further comprising:
   receiving an indication of the number of the plurality of LEDs;
   determining, based on the indication of the number of the plurality of LEDs and the voltage potential across the plurality of LEDs, the voltage potential across one LED of the plurality of LEDs,
   wherein calculating, based on the first signal indicating the voltage potential across the plurality of LEDs, the temperature of the plurality of LEDs comprises:
      comparing the voltage potential across the one LED of the plurality of LEDs to a reference voltage; and
      outputting, based on the comparison between the voltage potential across the one LED of the plurality of LEDs and the reference voltage, a first indication that a temperature of the at least one LED is greater than a maximum operating temperature.

8. The method of claim 1, wherein outputting the second signal configured to regulate the temperature of the plurality of LEDs by dynamically modulating the current regulator delivering current to the plurality of LEDs comprises:
   determining that the second signal is configured to decrease a duty cycle of a switch of the current regulator delivering current to the plurality of LEDs below a minimum duty cycle;
   adjusting, based on the determination, the second signal to decrease the duty cycle of the switch of the current regulator delivering current to the plurality of LEDs to the minimum duty cycle; and
   outputting the adjusted second signal configured to regulate the temperature of the plurality of LEDs by decreasing the duty cycle of the switch of the current regulator delivering current to the plurality of LEDs to the minimum duty cycle.

9. A temperature regulation circuit of a light emitting diode (LED) driver configured to:
   receive a first signal indicating a voltage potential across a plurality of LEDs;
   calculate, based on the first signal indicating the voltage potential across the plurality of LEDs, a temperature of the plurality of LEDs; and
   output, based on the calculated temperature of the plurality of the LEDs, a second signal configured to regulate the temperature of the plurality of LEDs by dynamically modulating a current regulator delivering current to the plurality of LEDs.

10. The temperature regulation circuit of claim 9, wherein the second signal configured to regulate the temperature of the plurality of LEDs by dynamically modulating the current regulator is further configured to regulate the temperature of the plurality of LEDs by dynamically modulating, using pulse-width modulation, a duty cycle of a switch of the current regulator.

11. The temperature regulation circuit of claim 10, wherein the second signal configured to regulate the temperature of the plurality of LEDs by dynamically modulating, using pulse-width modulation, the duty cycle of the switch of the current regulator is further configured to regulate the temperature of the plurality of LEDs by decreasing the duty cycle of the switch of the current regulator.

12. The temperature regulation circuit of claim 9, wherein the temperature regulation circuit, to calculate the temperature of the plurality of LEDs, is configured to:
   compare the first signal indicating the voltage potential across the plurality of LEDs to a reference voltage; and
   output, based on the comparison between the first signal indicating the voltage potential across the plurality of LEDs and the reference voltage, a first indication that a temperature of the plurality of LEDs is greater than a maximum operating temperature.

13. The temperature regulation circuit of claim 12, wherein the temperature regulation circuit, to calculate the temperature of the plurality of LEDs, further configured to compare the first indication to a saw tooth waveform; and
   wherein the temperature regulation circuit, to output, based on the calculated temperature, the second signal configured to regulate the temperature of the plurality of LEDs by dynamically modulating a current regulator delivering current to the plurality of LEDs, is further configured to output, based on the comparison between the first indication and the saw tooth waveform, the second signal configured to regulate the temperature of the plurality of LEDs by dynamically modulating the current regulator delivering current to the plurality of LEDs.

14. The temperature regulation circuit of claim 12, wherein the temperature regulation circuit to calculate the temperature of the plurality of LEDs, is further configured to compare the first indication to a signal generated by a pulse-width modulation (PWM) engine; and
   wherein the temperature regulation circuit, to output, based on the calculated temperature, the second signal configured to regulate the temperature of the plurality of LEDs by dynamically modulating a current regulator delivering current to the plurality of LEDs, is further configured to output, based on the comparison between the first indication and the signal generated by the PWM engine, the second signal configured to regulate the temperature of the plurality of LEDs by dynamically modulating the current regulator delivering current to the plurality of LEDs.

15. The temperature regulation circuit of claim 9, wherein the temperature regulation circuit is further configured to:
   receive an indication of the number of the plurality of LEDs;
   determine, based on the indication of the number of the plurality of LEDs and the voltage potential across the plurality of LEDs, the voltage potential across one LED of the plurality of LEDs, and
   wherein, to calculate, based on the first signal indicating the voltage potential across the plurality of LEDs, the temperature of the plurality of LEDs, the temperature regulation circuit is further configured to:
   compare the voltage potential across the one LED of the plurality of LEDs to a reference voltage; and
   output, based on the comparison between the voltage potential across the one LED of the plurality of LEDs and the reference voltage, a first indication that a temperature of the at least one LED is greater than a maximum operating temperature.

16. The temperature regulation circuit of claim 9, wherein the temperature regulation circuit configured to output the second signal configured to regulate the temperature of the plurality of LEDs by dynamically modulating the current regulator delivering current to the plurality of LEDs is further configured to:
   determine that the second signal is configured to decrease a duty cycle of a switch of the current regulator delivering current to the plurality of LEDs below a minimum duty cycle;
   adjust, based on the determination, the second signal to decrease the duty cycle of the switch of the current regulator delivering current to the plurality of LEDs to the minimum duty cycle; and
   output the adjusted second signal configured to regulate temperature of the plurality of LEDs by decreasing the duty cycle of the switch of the current regulator delivering current to the plurality of LEDs to the minimum duty cycle.

17. A system comprising:
   a plurality of light-emitting diodes (LEDs) configured to output a first signal indicating a voltage potential across the plurality of LEDs; and
   a light-emitting diode (LED) driver comprising:
   a temperature regulation circuit configured to:
   receive the first signal indicating the voltage potential across the plurality of LEDs;

calculate, based on the first signal indicating the voltage potential across the plurality of LEDs, a temperature of the plurality of LEDs; and output, based on the calculated temperature of the plurality of the LEDs, a second signal configured to regulate temperature of the plurality of LEDs by dynamically modulating a current regulator delivering current to the plurality of LEDs; and the current regulator, configured to deliver modulated current to the plurality of LEDs according to the second signal.

18. The system of claim 17, wherein the second signal configured to regulate the temperature of the plurality of LEDs by dynamically modulating a current regulator delivering current to the plurality of LEDs is further configured to regulate the temperature of the plurality of LEDs by dynamically modulating, using pulse-width modulation, a duty cycle of a switch of the current regulator.

19. The system of claim 17, wherein the second signal configured to regulate the temperature of the plurality of LEDs by dynamically modulating, using pulse-width modulation, the duty cycle of the switch of the current regulator is further configured to regulate the temperature of the plurality of LEDs by decreasing the duty cycle of the switch of the current regulator.

20. The system of claim 17, wherein the temperature regulation circuit, to calculate the temperature of the plurality of LEDs, is configured to:

compare the first signal indicating the voltage potential across the plurality of LEDs to a reference voltage; and output, based on the comparison between the first signal indicating the voltage potential across the plurality of LEDs and the reference voltage, a first indication that a temperature of the plurality of LEDs is greater than a maximum operating temperature.

21. The method of claim 1, wherein a relationship between the voltage potential across a plurality of LEDs and a temperature of a plurality of junctions of the plurality of LEDs is described by the ideal diode equation $$I = I_0 \left( e^{\frac{qV}{nkT}} - 1 \right),$$

wherein I is a current flowing through the plurality of LEDs, $I_0$ is a diode leakage current density of the plurality of LEDs, q is an absolute value of electron charge, V is the voltage potential across the plurality of LEDs, n is an ideality factor between 1 and 2 for the plurality of LEDs, k is Boltzmann's constant, and T is the temperature of the plurality of junctions of the plurality of LEDs.

22. The method of claim 21, wherein outputting the second signal configured to regulate temperature of the plurality of LEDs by dynamically modulating the current regulator delivering current to the plurality of LEDs comprises:

calculating, based on the first signal indicating the voltage potential across the plurality of LEDs and the ideal diode equation, the temperature of the plurality of junctions of the plurality of LEDs; and outputting the second signal configured to regulate the temperature of the plurality of junctions of the plurality of LEDs by dynamically modulating the current regulator delivering current to the plurality of LEDs.

* * * * *